United States Patent [19]

Perloff et al.

[11] Patent Number: 5,072,447
[45] Date of Patent: Dec. 10, 1991

[54] PATTERN INJECTOR

[75] Inventors: Ronald S. Perloff, Poway; Ramiro Calvo, Los Gatos, both of Calif.

[73] Assignee: National Semiconductor Corporation, Santa Clara, Calif.

[21] Appl. No.: 433,359

[22] Filed: Nov. 8, 1989

[51] Int. Cl.[5] .............................. G06F 11/00
[52] U.S. Cl. .................. 371/20.1; 371/15.1; 371/27
[58] Field of Search ............ 371/20.1, 20.3, 20.4, 371/20.5, 25.1, 15.1, 5.5, 3, 23, 27; 370/13, 14, 15; 375/10

[56] References Cited

U.S. PATENT DOCUMENTS

| 4,302,843 | 11/1981 | Bauernfeind | 371/20.4 X |
|---|---|---|---|
| 4,485,467 | 11/1984 | Miles | 370/14 |
| 4,745,603 | 5/1988 | Shedd | 371/27 |
| 4,775,977 | 10/1988 | Dehara | 371/25.1 X |
| 4,875,209 | 10/1989 | Mathewes | 371/25.1 X |
| 4,881,229 | 11/1989 | Kaltbeitzel | 371/20.4 |

OTHER PUBLICATIONS

Ross, Floyd E., "FDDI-an Overview", Digest of Papers, Computer Soc. Intl. Conf., Compcon '87, pp. 434-444.
FDDI Physical Layer Protocol (PHY) Sraft Proposed American National Standard, X3T9/85-39, Rev. 13, Aug. 22, 1986.
The SUPERNET TM Family for FDDI, Databook, Advanced Micro Devices, 1989.
SUPERNET TM for Fiber Distributed Data Interface, Articles, Advanced Micro Devices.

Primary Examiner—Robert W. Beausoliel
Attorney, Agent, or Firm—Limbach, Limbach & Sutton

[57] ABSTRACT

A pattern injector for testing stations in a data communications network and the physical link between them. The pattern injector replaces normal characters in a normal, unmodified stream with injection characters. The pattern injector includes a multiplexor that receives both a current normal character and the injection character as inputs and provides the injection character as its output upon receipt of a select signal. Selection logic responsive to mode selection inputs selectively provides the select signal to the multiplexor in response to the various programmable pattern injector modes. In the Off mode, no replacement of normal characters occurs. In the One-Shot mode, the $n^{th}$ normal character after detection of a preselected normal character in the unmodified stream is replaced with the injection character. In the Periodic mode, every $n^{th}$ normal character in the unmodified stream is replaced with the injection character. In the Continuous mode, all normal characters in the unmodified stream are replaced with the injection character.

17 Claims, 5 Drawing Sheets

FIG. 5

| II | JK | nn | ... | nn | ISRA,ISRB | nn | nn | nn | nn | nn | ..... |

N-th SYMBOL PAIR spans from JK through ISRA,ISRB.

FIG. 6

| XX | ISRA,ISRB | XX | ... | XX | ISRA,ISRB | XX | ... | XX | ISRA,ISRB | XX | ..... |

N-th SYMBOL PAIR (multiple occurrences)

FIG. 7

| XX | ISRA,ISRB | ISRA,ISRB | ISRA,ISRB | ISRA,ISRB | ISRA,ISRB | ISRA,ISRB | ISRA,ISRB | ISRA,ISRB | ISRA,ISRB | ISRA,ISRB | ..... |

PATTERN INJECTOR

BACKGROUND OF THE INVENTION

1. Field of the Invention

The present invention relates to data communications systems and, in particular, to a pattern injector for selectively replacing the normal characters of an unmodified character stream with programmable injection characters in real time for the purpose of testing the stations in a data communications network and the physical links between stations.

2. Discussion of the Prior Art

Asynchronous communication between stations in a data transmission network occurs through the transmission of a series, or "frame", of information characters, with adjacent frames being separated by explicit or implicit start-stop patterns. The use of a unique start pattern ("start delimiter") and a unique stop pattern ("end delimiter") allows the receiving station to identify the exact beginning and the exact end of each received frame.

A particular type of data transmission network is defined by the Fiber Distributed Data Interface (FDDI) protocol. The FDDI protocol is an American National Standards Institute (ANSI) data transmission standard which applies to a 100 Mbit/sec. token ring network that utilizes an optical fiber transmission medium. The FDDI protocol is intended as a high performance interconnection between a number of computers as well as between the computers and their associated mass storage subsystems and other peripheral equipment.

Information is transmitted on an FDDI ring in frames that consist of a sequence of 5-bit characters or "symbols", each symbol representing 4 data bits. Information is typically transmitted in symbol pairs or "bytes". Tokens are used to signify the right to transmit characters between stations.

Of the thirty-two member FDDI standard symbol set, sixteen are data symbols (each representing four bits of ordinary data) and eight are control symbols. The eight control symbols are J (the first symbol of a start delimiter byte JK), K (the second symbol of a start delimiter byte JK), I (Idle), H (Halt), Q (Quiet), T (End Delimiter), S (Set) and R (Reset).

A continuous stream of control symbol patterns defines a line state. The FDDI protocol defines four line states:

(1) Idle Line State (ILS), which is a continuous stream of Idle symbols;
(2) Quiet Line State (QLS), which is a continuous stream of Quiet symbols;
(3) Halt Line State (HLS), which is a continuous stream of Halt symbols; and
(4) Master Line State (MLS), which is an alternating stream of Halt and Quiet symbols.

The remaining eight symbols of the FDDI standard symbol set are not used since they violate code run length and DC balance requirements of the protocol.

Table I below sets forth the FDDI standard symbol set.

TABLE I

| FDDI STANDARD SYMBOL SET | |
|---|---|
| SYMBOL | CODE |
| 0 | 11110 |
| 1 | 01001 |
| 2 | 10100 |
| 3 | 10101 |
| 4 | 01010 |
| 5 | 01011 |
| 6 | 01110 |
| 7 | 01111 |
| 8 | 10010 |
| 9 | 10011 |
| A | 10110 |
| B | 10111 |
| C | 11010 |
| D | 11011 |
| E | 11100 |
| F | 11101 |
| J | 11000 |
| K | 10001 |
| I | 11111 |
| H | 00100 |
| Q | 00000 |
| T | 01101 |
| S | 11001 |
| R | 00111 |

FIG. 1 shows the fields which are used within the FDDI frame and token formats A preamble field (PA), which consists of a sequence of Idle symbols, precedes every transmission. The Idle symbols provide a maximum frequency signal which is used for receive clock synchronization. The Start Delimiter field (SD) consists of a two symbol start delimiter pair which is uniquely recognizable independent of symbol boundaries. As stated above, the Start Delimiter byte establishes the boundaries for the information that follows. The Frame Control field (FC) defines the type of frame and its characteristics; it distinguishes synchronous from asynchronous transmission, specifies the length of the address and identifies the type of frame. The Frame Control field uniquely distinguishes a token. The Ending Delimiter field (ED) of a token consists of two end delimiter symbols and completes a token. The Destination Address (DA) and Source Address (SA) fields contain the destination and source addresses of the transmitted frame. The Destination Address field and the Source Address field are both either two bytes long or six bytes long, as determined by the Frame Control field. The Destination Address may be either an individual address or a group address. The Frame Check Sequence field (FCS), which is four bytes long, contains a cyclic redundancy check using the ANSI standard polynomial. The INFORMATION field, as is the case for all fields covered by the Frame Check Sequence check, consists only of data symbols. The End Delimiter of a frame is one end delimiter symbol (T), which is followed by the Frame Status field (FS) which consists of three control indicator symbols which indicate whether the addressed station has recognized its address, whether the frame has been copied, or whether any station has detected an error in the frame. The "T" symbol followed by three control indicators represents the minimum end delimiter required by the FDDI protocol for a non-token frame. The protocol allows for additional pairs of control symbols in the End Delimiter or an additional odd number of control symbols followed by one last "T" symbol. All conforming implementations must be able to process these extended end delimiters without truncating them. The end delimiter symbol "T" and the two control symbols "R" and "S"

are uniquely encoded and distinguishable from either normal data or Idle symbols.

FIG. 2 shows the component entities necessary for a station to be in compliance with the FDDI protocol. The identified components include a Station Management function (SMT) which is a part of network management that resides in each station on the network to control the overall action of the station to ensure proper operation as a member of the ring. A Physical function (PHY) provides the hardware connection to adjacent stations. A Media Access Control function (MAC) controls access to the transmission medium, transmitting frames to and receiving frames from the Media Access Control functions of other stations.

The Physical function provides the optical fiber hardware components that allow a link from one FDDI station to another (It should be noted that a Physical Media Dependent portion of the FDDI protocol specifies the opto-mechanical hardware to be used for connection to adjacent nodes; the Physical function standard covers the area from optical characteristics through the symbol or byte wide interface with the Media Access Control function.). The Physical function simultaneously receives and transmits. The Physical function's transmit logic accepts characters from the Media Access Control function, converts them to FDDI symbols and transmits the encoded serial stream on the medium. The Physical function's receive logic receives the encoded serial stream from the medium, establishes symbol boundaries based on the recognition of a start delimiter symbol pair and forwards decoded symbols to its associated Media Access Control function.

Additional information regarding the FDDI protocol is presented by Floyd E. Ross, "FDDI—an Overview", Digest of Papers, Computer Soc. Intl. Conf., Compcon '87, pp. 434-444, which is hereby incorporated by reference to provide additional background information regarding the present invention.

SUMMARY OF THE INVENTION

The present invention provides a pattern injector for testing stations in a data communications network and the physical link between stations. The pattern injector modifies the normal, unmodified character stream by replacing selected normal characters in the unmodified stream with programmable injection characters in real time, thus causing no transmission delay.

The pattern injector includes a multiplexor that receives both the normal characters of the unmodified stream and the injection characters and replaces the former with the latter upon receipt of a select signal. Selection logic responsive to mode selection inputs selectively provides the select signal to the multiplexor in response to the various programmable pattern injector modes.

The disclosed embodiment of a pattern injector in accordance with the present invention operates in one of four modes: Off, One-Shot, Periodic and Continuous. If the pattern injector is in the Off mode, then no replacement of normal characters will occur. If it is in the One-Shot mode, then it will replace the $n^{th}$ normal character after detection of a predefined character in the unmodified stream with injection characters, "n" being a programmable value; when "n" is 0, the pattern injector replaces the predefined normal character itself with the injection character. If it is in the Periodic mode, the pattern injector will periodically replace normal characters with the injection characters every $n^{th}$ normal character; in this mode, there is no alignment with the predefined character. If the pattern injector is in the Continuous mode, then all normal characters are replaced with injection characters.

The pattern injector places programmable injection characters into the encoded FDDI symbol stream. Therefore, it can create bit combinations that cannot be generated in any other deterministic way. This provides a means with which to test error handling mechanisms in the FDDI Physical and Media Access Control Layers.

Other features and advantages of the present invention will be understood and appreciated by reference to the detailed description of the invention provided below which should be considered in conjunction with the accompanying drawings.

DESCRIPTION OF THE DRAWINGS

FIG. 5 is a diagram illustrating pattern injection by a pattern injector in accordance with the present invention operating in the One-Shot mode.

FIG. 6 is a diagram illustrating pattern injection by a pattern injector in accordance with the present invention operating in the Periodic mode.

FIG. 7 is a diagram illustrating pattern injection by a pattern injector in accordance with the present invention operating in the Continuous mode.

DETAILED DESCRIPTION OF THE INVENTION

Figure 1:
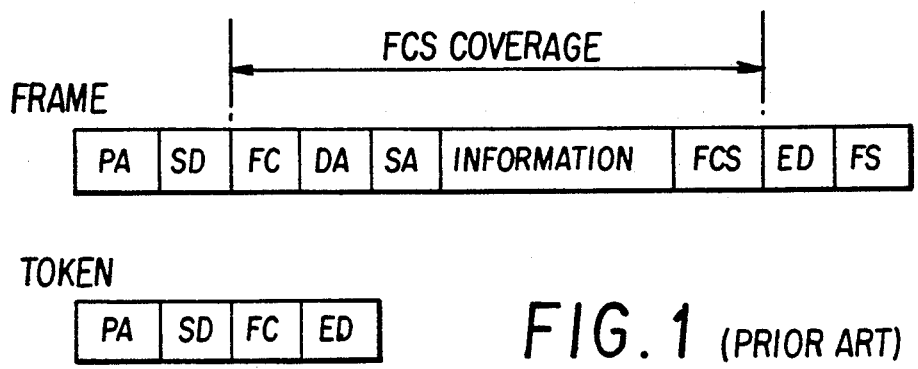
FIG. 1 is a diagram illustrating the fields used within the FDDI frame and token formats.
Figure 2:
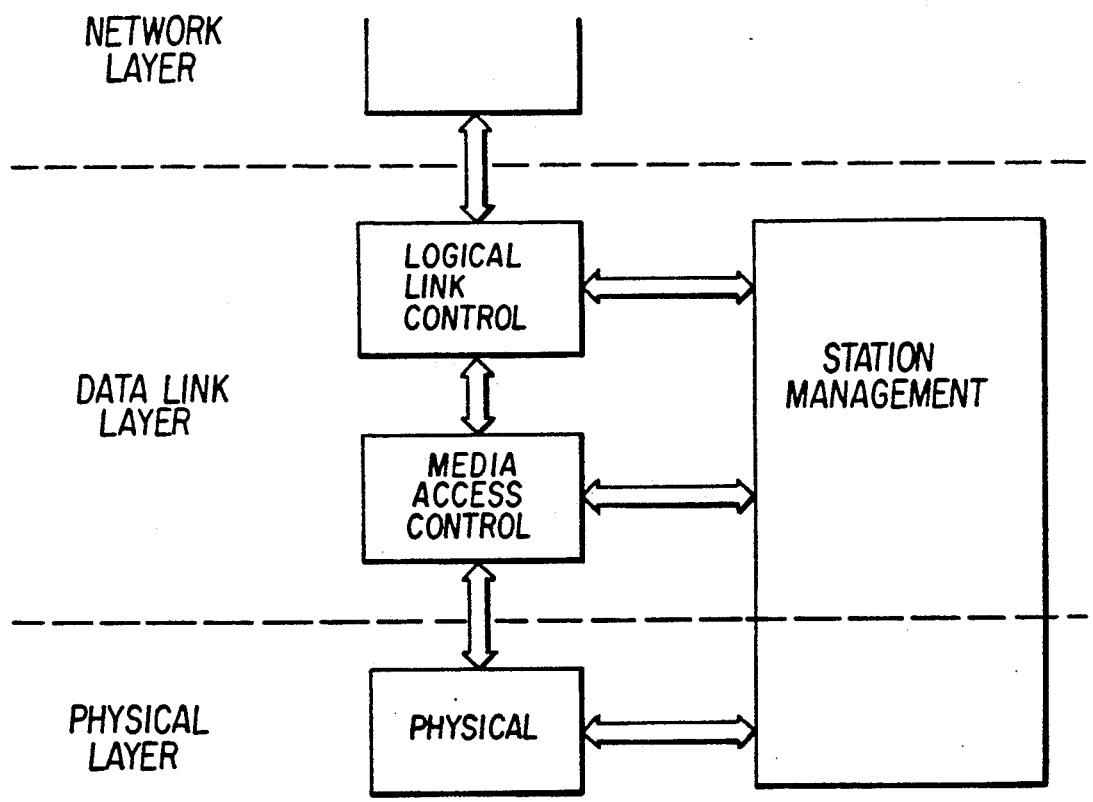
FIG. 2 is a block diagram illustrating the components necessary for a station to be in compliance with the FDDI protocol.
Figure 3:
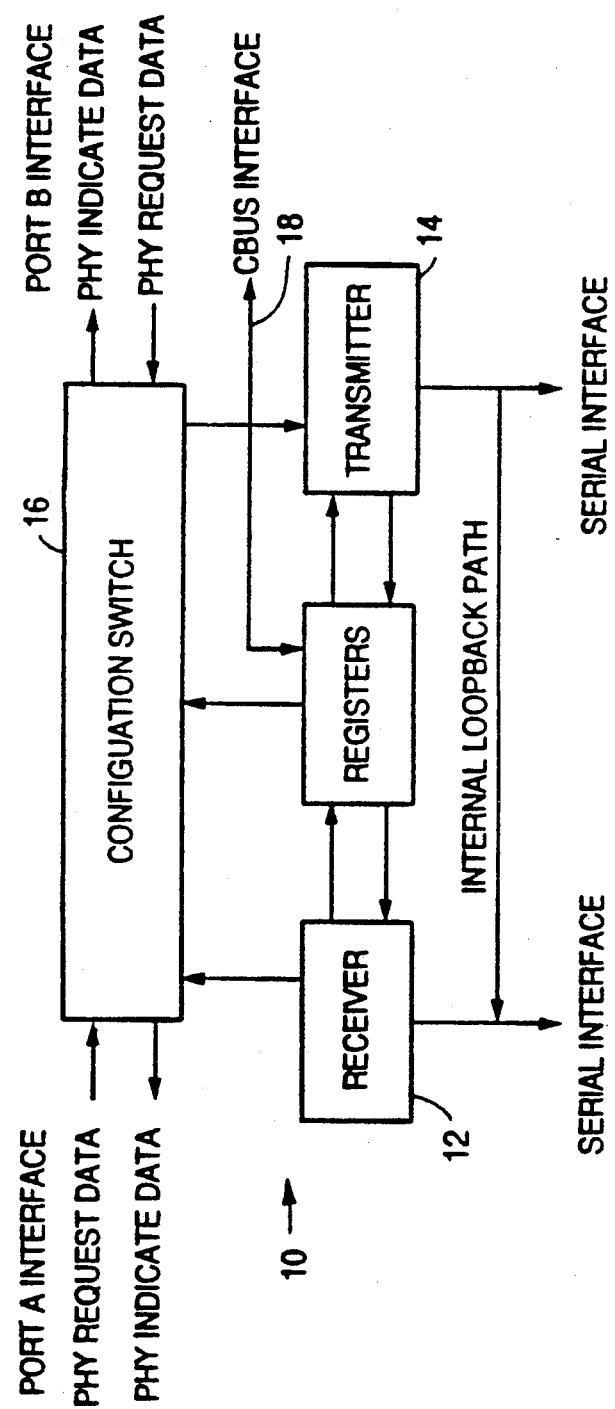
FIG. 3 is a block diagram illustrating an embodiment of a FDDI Physical Layer function.

FIG. 3 shows a block diagram of a Physical Layer Controller (Player) 10 which implements the Physical function as defined by the Fiber Distributed Data Interface (FDDI) protocol.

The Player 10 includes four primary blocks: a receiver 12, a transmitter 14, a configuration switch 16 and a control bus interface 18. The Player 10 also incorporates a number of storage registers which retain data which define the operating characteristics of the Player 10.

The receiver 12 accepts serial binary information from either the serial interface with the FDDI network fiber optic transmission medium or from the transmitter 14 via an internal loopback path. The receiver 12 converts the information stream from Non-Return-To-Zero-Invert-On-Ones (NRZI) format utilized on the FDDI medium to Non-Return-To-Zero (NRZ) format used internally by the receiving station and decodes the NRZ data from external 5B coding to internal 4B coding. The receiver 12 establishes the 5-bit symbol boundaries for the serial bit stream and synchronizes the upstream station's clock to the local station clock. The receiver 12 also performs line state detection, link error detection and presents the data to the configuration switch 16 as internally coded symbol pairs.

The transmitter 14 accepts information characters as symbol pairs from the configuration switch 16. It encodes the symbol pairs from the internal 4B coding to the external 5B coding, filters out code violations in the information stream and redistributes Idle bytes which were added or deleted by the elasticity buffer. In addition, transmitter 14 is capable of generating Idle, Master, Halt, Quiet or other user defined symbol pairs. The transmitter 14 also converts the stream from NRZ to NRZI and presents it to either the receiver 12 via the internal loopback path or to the FDDI fiber optic medium as a serial bit stream.

The primary function of the configuration switch 16 is to configure the information flow to support multiple station configurations for different station types without external logic.

The control bus interface 18 allows the user to program the configuration switch 16, to enable and disable functions within the receiver 12 and the transmitter 14, to report line states and link errors detected by the receiver 12 and to report error conditions.

Figure 4:
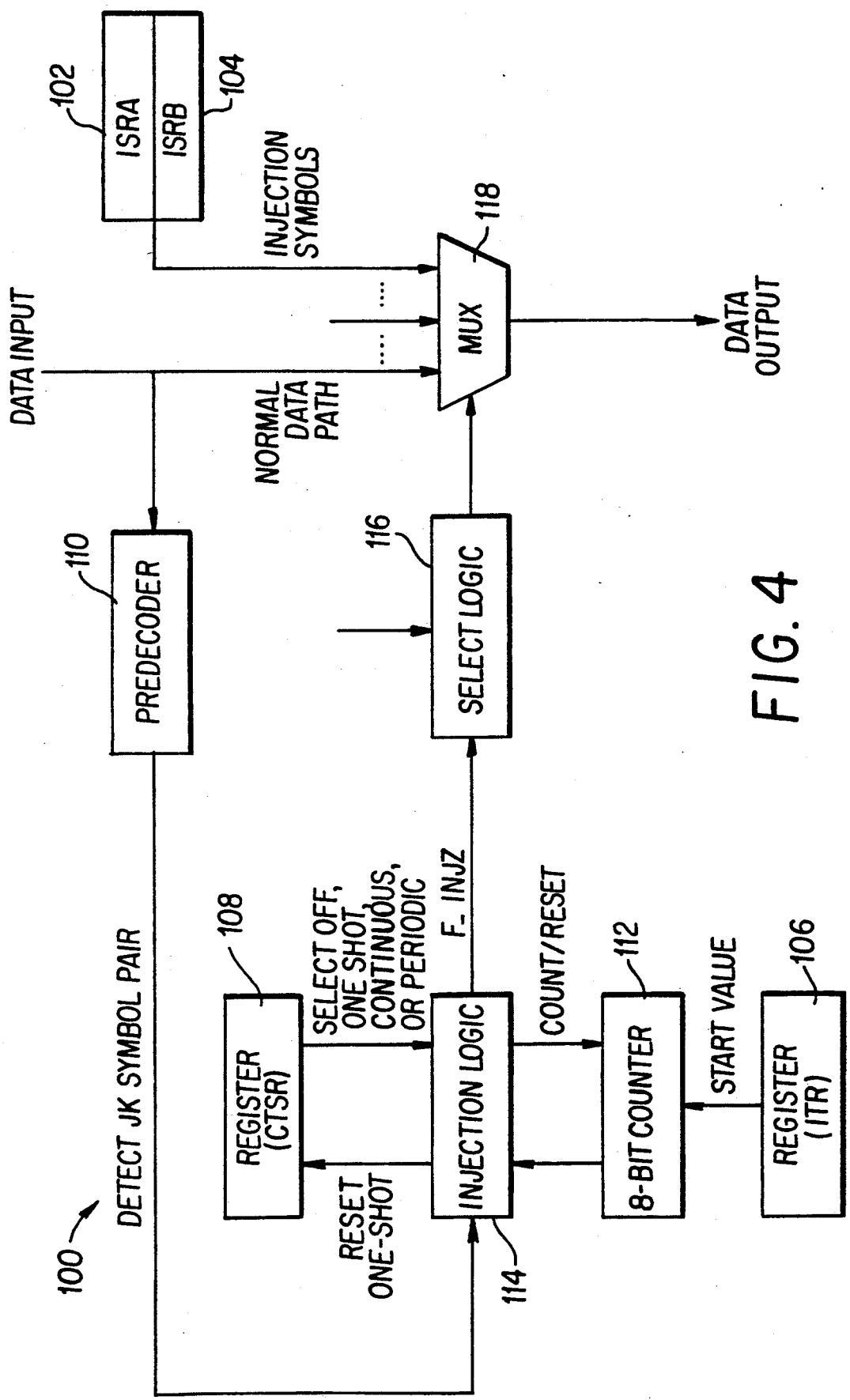
FIG. 4 is a block diagram illustrating an embodiment of a pattern injector in accordance with the present invention.

Referring to FIG. 4, in accordance with the present invention, the receiver 12 includes a Pattern Injector 100 which selectively replaces normal characters, i.e. encoded FDDI symbol pairs, in the normal, unmodified stream with a programmable injection symbol pair.

As described in greater detail below, the Pattern Injector 100 may be programmed to operate in one of the following four injection modes: Off, One-Shot, Periodic and Continuous. In the Off mode, the unmodified stream remains unchanged. In the One-Shot mode, the injection symbol pair replaces the $n^{th}$ normal symbol pair after detection of a preselected symbol pair in the normal outgoing unmodified stream. In the Periodic mode, the injection symbol pair is injected into the unmodified stream to replace every $n^{th}$ symbol pair. In the Continuous mode, all normal symbol pairs are replaced with the injection symbol pair.

The One-Shot, Periodic and Continuous modes are illustrated in FIGS. 5, 6 and 7, respectively.

Referring back to FIG. 4, the Pattern Injector 100 includes four registers 102, 104, 106, 108, a Predecoder 110, a Counter 112, Injection Request Logic 114, Selector Logic 116 and multiplexors 118.

Registers 102 and 104, i.e. Injection Symbol Register A and Injection Symbol Register B, contain the Programmable Injection Symbols ISRA and ISRB, respectively. As explained in greater detail below, the Injection Threshold Register (ITR) 106 contains the start value for the Counter 112. The operating mode of the Pattern Injector 100 is set through user-selected Injection Control bits contained in the Current Transmit State Register (CTSR) 108.

Predecoder 110 detects a start delimiter symbol pair, i.e. JK, in the normal input stream received by the transmitter 14. If the Pattern Injector 100 is set to be in the One-Shot mode, then it uses the start delimiter symbol pair JK as a reference point for Counter 112 to determine which two normal symbols in the unmodified stream will be replaced with the Injection Symbol pair ISRA, ISRB.

Counter 112 is an 8-bit down counter with a programmable start value contained in the Injection Threshold Register 106. Counter 112 is used by the Injection Request Logic 114 to count the number of symbol pairs in the unmodified stream that have been received by the transmitter 14 after the Counter 112 has been enabled. In the One-Shot mode, the Pattern Injector 100 will replace the current normal symbol pair in the unmodified stream input to multiplexor 118 with the Injection Symbol pair when the value of Counter 112 reaches 0. The function of the Injection Request Logic 114 is to determine when to inject the Injection Symbol pair, based on the current operating mode of the Pattern Injector 100 and the current value of the Counter 112.

Select Logic 116 controls multiplexors 118 in order to select either the current normal symbol pair at the unmodified stream input to multiplexor 118 or the Injection Symbol pair ISRA, ISRB as the output of the transmitter 14. Select Logic 116 grants highest priority to the asserted output of Injection Request Logic 114, passing it through to multiplexor 118. It will be understood by those skilled in the art that a number of cascaded multiplexors are actually utilized to provide the byte-wide data output of the transmitter 14; this cascaded multiplexor structure is represented in FIG. 4 by the single multiplexor block 118.

The Injection Control bits contained in the Current Transmit State Register (CTSR) 108 are set to "00" for the Off state. As stated above, in this state, the values of the Injection Symbols ISRA and ISRB and of the Injection Threshold Register 106 have no effect on the data stream.

In the One-Shot mode, the Injection Control bits are set to "01". When the Pattern Injector 100 enters this mode, the Injection Request Logic 114 loads the value of "n" into the Counter 112. Then, when it detects the next Start Delimiter symbol pair JK, it simultaneously enables the Counter 112 and begins checking for the Counter value of 0. When the Counter value is 0, the Injection Request Logic 114 resets the Injection Control bits to "00", i.e. to the Off mode, acknowledging the completion of the One-Shot injection operation, and instructs the Select Logic 116 to provide the select signal the multiplexor 118 to replace the current normal symbol pair with the Injection Symbol pair ISRA, ISRB.

A unique feature of the One-Shot mode is that the user has full control of the position of the injected symbols. For example, the start delimiter byte JK can itself be replaced with the Injection Symbol pair if the start value of the Counter 112, i.e. the value of the Injection Threshold Register 106, is set to 0.

For the Periodic mode, the injection control bits are set to "10". In this mode, the Injection Logic 114 immediately enables the Counter 112. Every time the Counter 112 reaches 0, the Injection Request Logic 114 instructs the Select Logic 116 to provide the select signal to multiplexor 118 to replace the current normal data symbol pair with the Injection Symbol pair ISRA,ISRB. At that time, the Counter 112 is also reloaded with the value of the Injection Threshold Register 106, and again counts down to 0, resulting in another injection of the Injection Symbol pair. This process continues to repeat itself unless the operating mode of the Pattern Injector 100 is changed. This results in every $n^{th}$ normal symbol pair in the unmodified stream being replaced with the Injection Symbol pair ISRA, ISRB.

For the Continuous mode, the injection control bits are set to "11". In this mode, the Injection Logic 114 instructs the Select Logic 116 to replace all normal symbol pairs with the Injection Symbol pair ISRA, ISRB. Injection Symbols ISRA, ISRB will continue to replace the symbol pairs of the unmodified stream unless the operating mode of the Pattern Injector 100 is changed.

Figure 8:
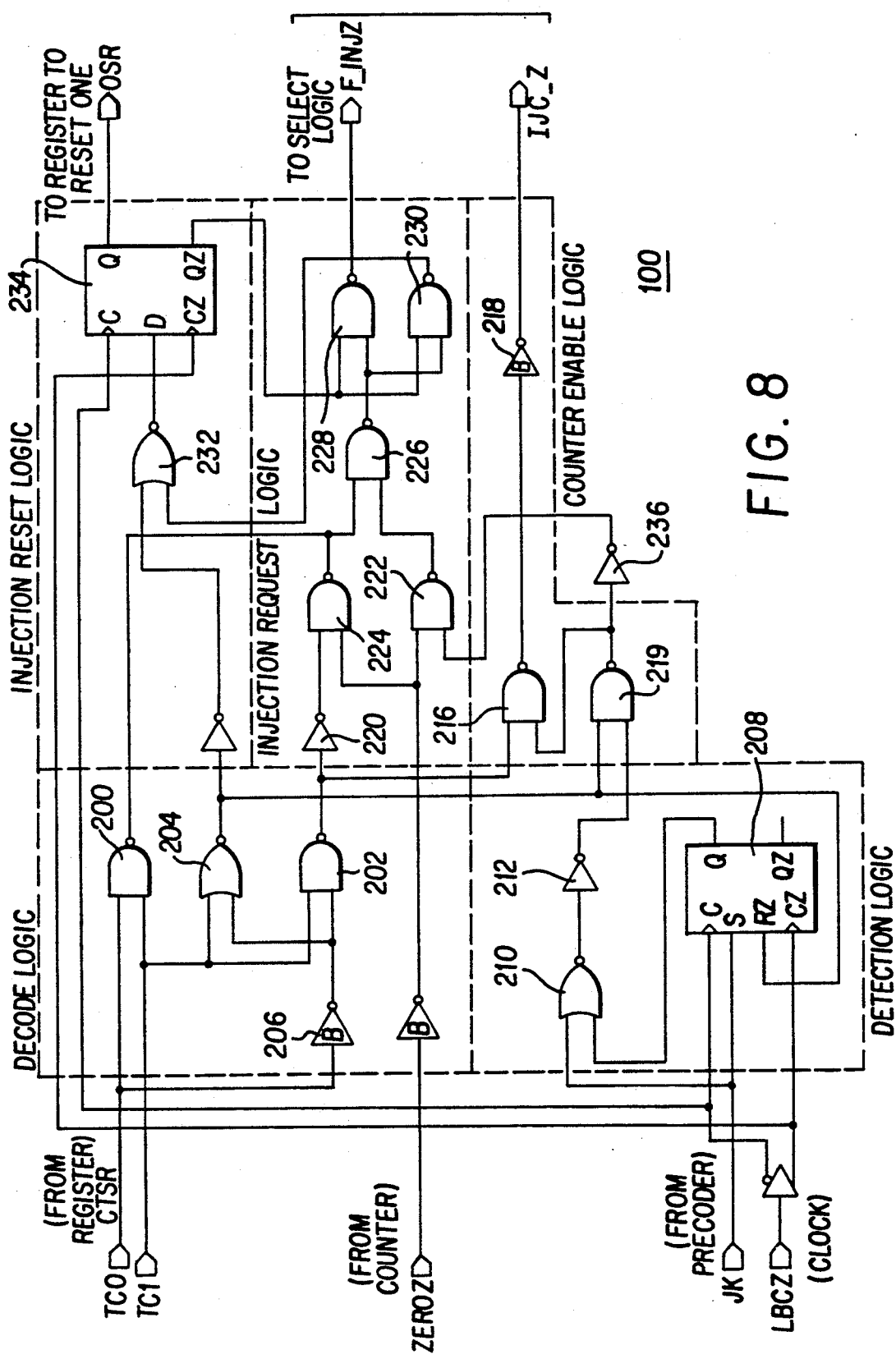
FIG. 8 is a logic diagram illustrating an embodiment of a pattern injector in accordance with the present invention.

FIG. 8 shows a logic embodiment of a Pattern Injector 100 in accordance with the present invention.

AND gates 200 and 202, NOR gate 204 and inverter 206 provide decoder logic which implements the decode of the four injection modes identified by the two-bit output IC0, IC1 of the Current Transmit State Register (CTSR) 108.

RS flip-flop 208, together with NOR gate 210 and inverter 212, provides detection logic for storing the event that a start delimiter symbol pair JK has been detected in the transmitter data path. Note that in the case where the Injection Counter Threshold is set to zero, flip-flop 208 is bypassed and the event is reported directly to the injection request logic, which is described in greater detail below.

AND gates 214 and 216 and inverter 218 provide enable logic that enables the 8-bit down counter 112 (FIG. 4) when the detection logic described above detects a start delimiter symbol pair JK, and the Pattern Injecter 100 is in either the One-Shot mode or the Periodic mode. Once the IJC-Z signal is asserted (active low), it will stay asserted until the counter 112 reaches zero or until the injection mode is changed Gates 220-230 provide injection request logic for requesting that the multiplexor 118 on the transmitter data path select the Injection Symbol paid ISRA, ISRB as the output of the Player function transmitter block. In the One-Shot mode, the injection request logic will assert the F_INJZ signal only for 80 ns (i.e. a symbol pair). In the Periodic Mode, the logic will assert the F_INJZ signal every $n^{th}$ symbol pair for exactly 80 ns. In the Continuous mode, the F_INJZ signal is continuously asserted.

In the One-Shot mode, logic gates 232, 234 and 236 reset Injection Control bit 0 (IC0) after completion of the One-Shot injection of the Injection Symbol paid ISRA, ISRB and ensure that the signal F_INJZ is asserted for only 80 ns.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A pattern injector for selectively replacing normal characters in a normal, unmodified stream with an injection character, the pattern injector comprising:
   (a) multiplexor means that receives both a sequence of the normal characters of the unmodified stream and the injection character as inputs and replaces a selected normal character with the injection character in the sequence upon receipt of a select signal;
   (b) a predecoder for detecting a predetermined characteristic of the unmodified stream; and
   (c) selection means connected between the predecoder and the multiplexor means for providing the select signal to the multiplexor means in response to detection of the predetermined characteristic by the predecoder.

2. A pattern injector as in claim 1 wherein the predetermined characteristic is a preselected normal character in the unmodified stream and the selection means comprises means for providing the select signal to the multiplexor means subsequent to detection of the predetermined characteristic such that the multiplexor means replaces the $n^{th}$ normal character in the sequence after the preselected normal character with the injection character.

3. A pattern injector as in claim 1 wherein the selection means comprises means for providing the select signal to the multiplexor means in direct response to detection of the preselected normal character such that multiplexor means replaces the preselected normal character with the injection character.

4. A pattern injector as in claim 2 or 3 wherein the preselected normal character is a Start Delimiter symbol pair JK of an FDDI symbol set.

5. A pattern injector for selectively replacing normal characters in a normal, unmodified stream with an injection character, the pattern injector comprising:
   (a) multiplexor means that receives both a sequence of the normal characters of the unmodified stream and the injection character as inputs and replaces a selected normal character in the sequence with the injection character as its output in response to receipt of a select signal; and
   (b) selection means for periodically generating the select signal in response to injection input signals to the selection means such that the multiplexor means replaces each $n^{th}$ normal character in the sequence with the injection character.

6. A pattern injector for selectively replacing normal characters in a normal, unmodified stream with an injection character, the pattern injector comprising:
   (a) multiplexor means that receives both a sequence of the normal characters of the unmodified stream and the injection character as inputs and replaces normal characters in the sequence with the injection character as its output in response to receipt of a select signal; and
   (b) selection means for continuously generating the select signal in response to injection input signals to the selection means such that the multiplexor means continuously replaces all normal characters in the sequence with the injection character such that the multiplexor means output consists of a continuous sequence of the injection character.

7. A pattern injector as in claim 1, 5 or 6 wherein the injection character is programmable.

8. A pattern injector for selectively replacing normal characters in a normal, unmodified stream with an injection character, the pattern injector comprising:
   (a) programmable storage means for storing the injection character;
   (b) a multiplexor connected to receive both a current normal character in a sequence of normal characters and the injection character as inputs and which replaces the current normal character with the injection character in response to assertion of a select signal;
   (c) a predecoder for detecting a preselected normal character in the sequence;
   (d) counter means for counting normal characters in the sequence after detection of the preselected normal character;
   (e) means for enabling the counter means in response to detection of the preselected normal character by the predecoder; and
   (f) select means for asserting the select signal when the counter reaches a preselected count.

9. A pattern injector for selectively replacing normal characters in a normal, unmodified stream with an injection character, the pattern injector comprising:
   (a) programmable storage means for storing the injection character;
   (b) a multiplexor connected to receive a sequence of normal characters and the injection character as inputs and which replaces a current normal character in the sequence with the injection character in response to assertion of a select signal;
   (c) counter means for counting the current normal characters in the sequence;
   (d) means for enabling the counter in response to injection input signals;
   (e) select means for asserting the select signal when the counter reaches a preselected count; and
   (f) means for continuously resetting the counter means when the counter means reaches the preselected count whereby the multiplexor means periodically replaces the current normal character input to the multiplexor means with the injection character such that each $n^{th}$ normal character in the sequence is replaced with the injection character.

10. A pattern injector as in claim 8 or 9 wherein the counter is a down-counter having a start value and the select means comprises means for asserting the select signal when the down-counter reaches zero.

11. A pattern injector as in claim 10 wherein the start value is zero whereby the select means continuously asserts the select signal such that the multiplexor continuously replaces the current normal character with the injection character.

12. A method of replacing normal characters in a normal, unmodified stream with an injection character, the method comprising:
   (a) detecting a predetermined characteristic of a normal character in the unmodified stream;
   (b) replacing the normal character in the unmodified stream with the injection character in response to detection of the predetermined characteristic.

13. A method as in claim 12 wherein the predetermined characteristic is a preselected normal character in the unmodified stream and the injection character replaces the $n^{th}$ normal character in the unmodified stream after the preselected normal character.

14. A method of replacing normal characters in a normal, unmodified stream with an injection character, the method comprising:
   (a) storing the injection character;
   (b) replacing a current normal character in the unmodified stream with the injection character in response to assertion of a select signal;
   (c) detecting a preselected normal character in the unmodified stream;
   (d) counting the number of normal characters in the unmodified stream following the preselected normal character; and
   (e) asserting the select signal when the number of normal characters counted equals "n", n being an integer value
   whereby the $n^{th}$ normal character after the preselected normal character is replaced by the injection character.

15. A method as in claim 13 or 14 wherein the preselected normal character is a Start Delimiter symbol pair JK of an FDDI symbol set.

16. A method of replacing normal characters in a normal, unmodified stream with an injection character, the method comprising:
   (a) storing the injection character;
   (b) replacing a normal character in the unmodified stream with the injection character in response to assertion of a select signal;
   (c) detecting each $n^{th}$ normal character in the unmodified stream; and
   (d) asserting the select signal in response to detection of each $n^{th}$ normal character
   whereby the injection character replaces each $n^{th}$ normal character in the unmodified stream.

17. A method of replacing normal characters in a normal, unmodified stream of characters with an injection character, the method comprising;
   (a) storing the injection character;
   (b) replacing a normal character in the unmodified stream with the injection character in response to assertion of a select signal;
   (c) continuously asserting the select signal
   whereby the injection character replaces all normal characters in the unmodified stream such that the unmodified stream consists of a continuous sequence of the injection character.

* * * * *